Aug. 19, 1958 P. J. MORE 2,847,932
ROTISSERIE RACK
Filed Dec. 28, 1955 2 Sheets-Sheet 1
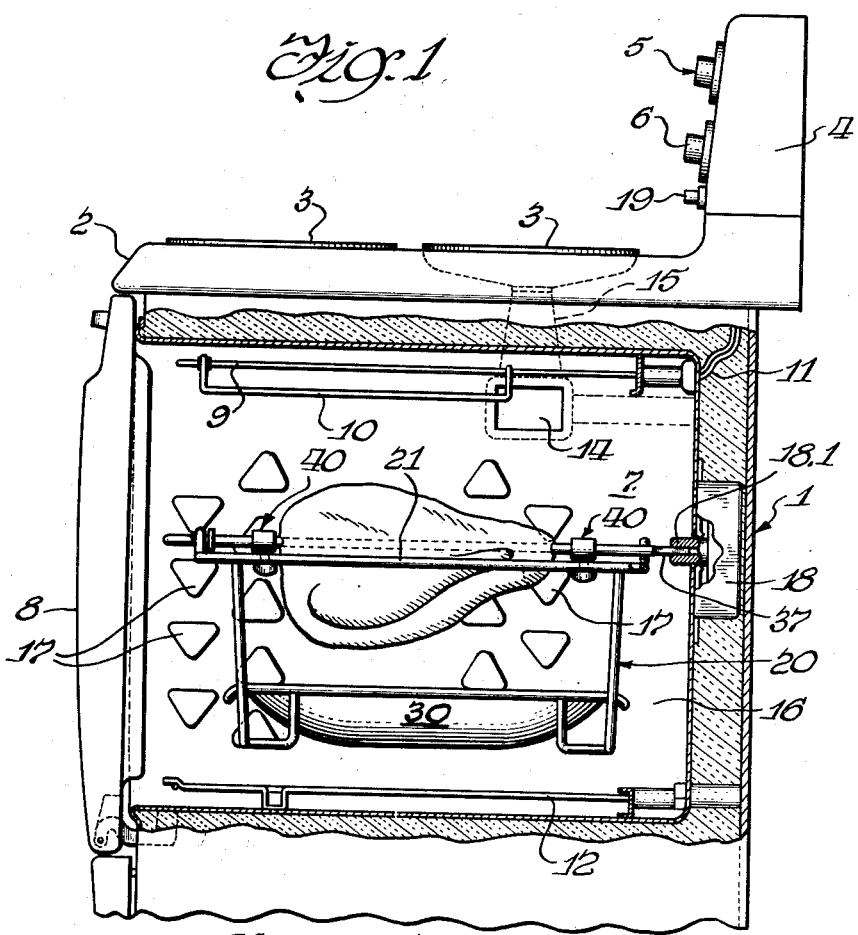
Fig. 1
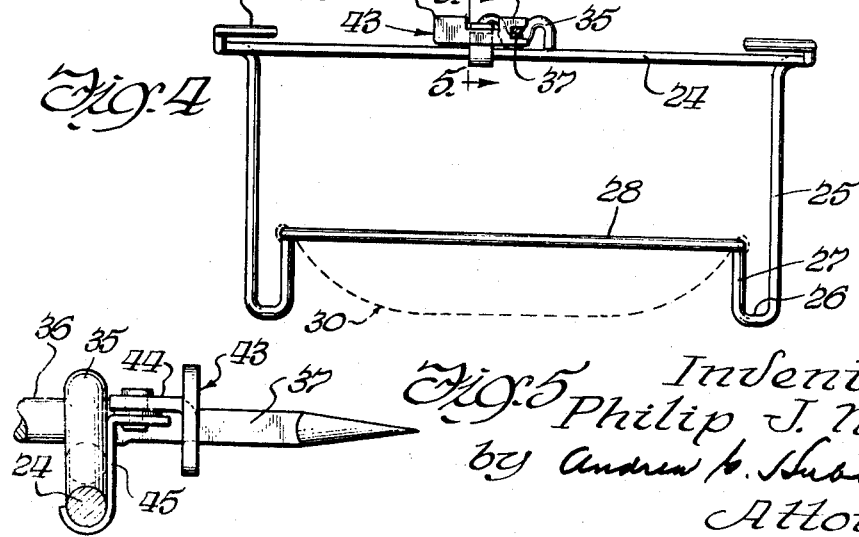
Fig. 4
Fig. 5
Inventor
Philip J. More
by Andrew P. Hubbard
Attorney Aug. 19, 1958   P. J. MORE   2,847,932
ROTISSERIE RACK
Filed Dec. 28, 1955   2 Sheets-Sheet 2
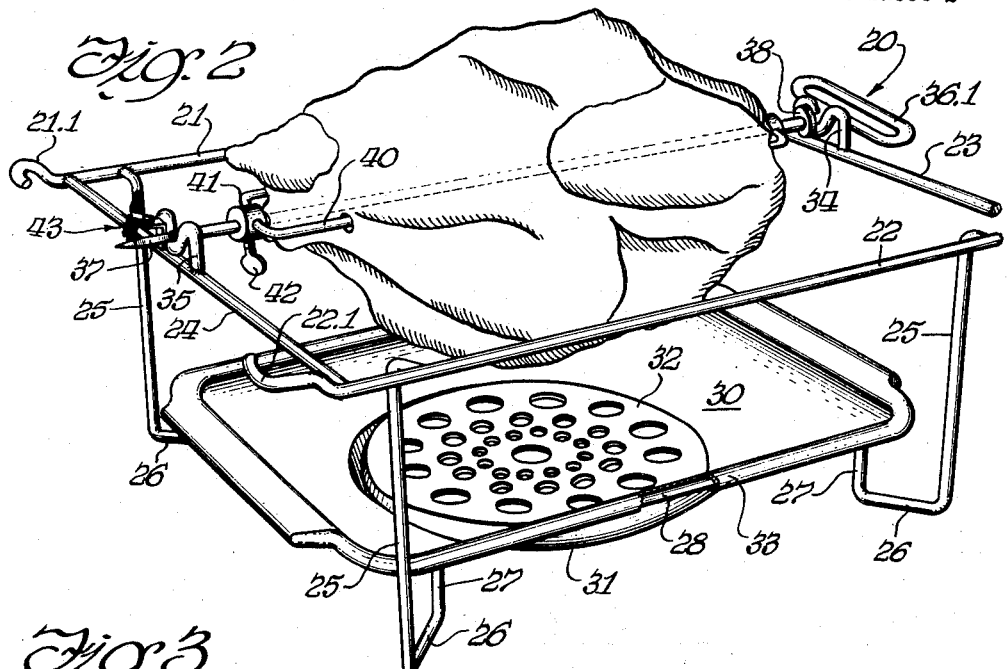
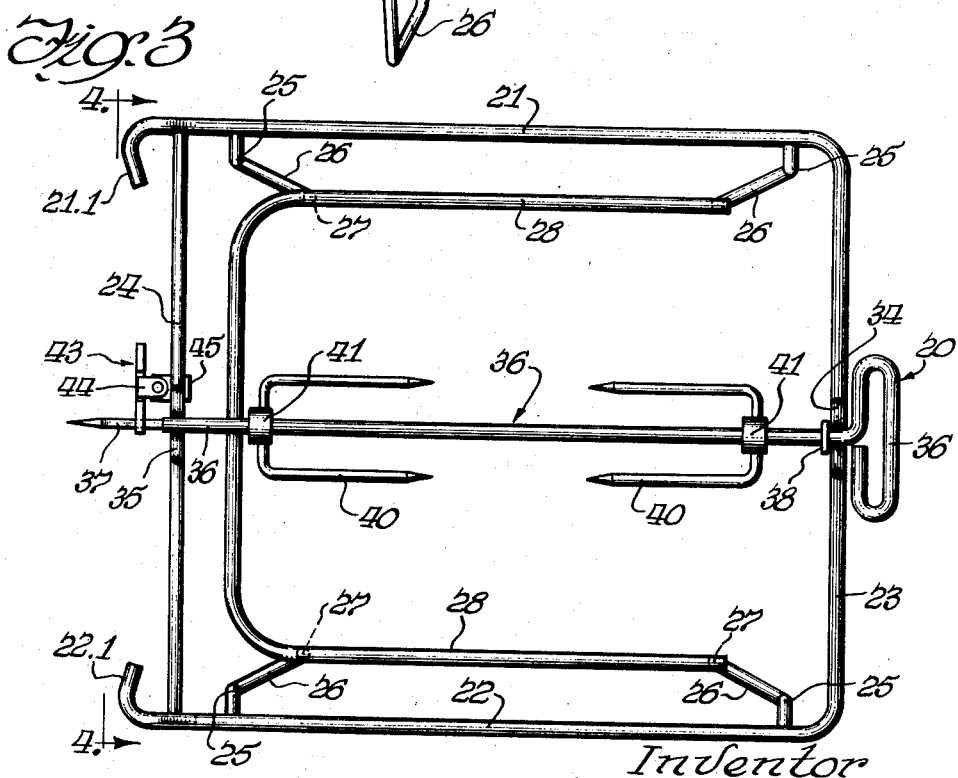
Inventor
Philip J. More
by Andrew B. Hubbard
Attorney United States Patent Office 2,847,932
Patented Aug. 19, 1958

2,847,932

ROTISSERIE RACK

Philip J. More, Evanston, Ill., assignor to General Electric Company, a corporation of New York Application December 28, 1955, Serial No. 555,805

1 Claim. (Cl. 99—421)

This invention relates to cooking utensils, and, in particular, to an improved rotisserie rack for cooking ranges and the like.

Rotisserie cooking, in which the foodstuff is rotated in relatively close proximity to a radiant heat source, is a very old culinary art, and many people consider that such cooking imparts better flavor to the produce and less loss by shrinkage and other factors than does the older and more generally used roasting method. Preference for rotisserie cooking has resulted in the inclusion of rotisserie devices in domestic ranges; in such ranges the rotisserie provision has comprised a motor-driven socket extending rotatably into the oven cavity, and suitable bearing structure rotatably supported within the oven for carrying the spit on which the foodstuff is impaled. An end of the spit is, of course, engaged by the drive socket for rotation thereby.

These devices have performed admirably in producing well cooked foods, but they have a serious practical disadvantage in respect to the difficulty of simultaneously handling both the spit—which may be carrying as much as a fifteen pound article of food—and the drip pan, when the food is being removed from the oven. Obviously, it is advantageous to remove the spit and the drip pan simultaneously, because of drippage from the cooked food and the practical necessity for maintaining the pan beneath it to prevent the food juices from dropping onto the floor of the kitchen. There is the further disadvantage of supporting the cooked food for carving; in the conventional rotisserie spit as developed for use with domestic and small restaurant ranges, the spit may interfere with the carving and is usually removed prior thereto.

It is a main object of my invention to provide a rotisserie rack having a spit support, means for securely carrying a removable drip pan to intercept and collect drippings from the foodstuff on the spit, and leg structures for supporting the rack on a counter or table at which the carving and serving are to be done, whereby the removal of the cooked foodstuff from the oven is simplified and without hazard.

It is a further object of the invention to provide a rotisserie rack which is self-supporting on a table or counter, and has means by which the spit may be manually rotated and secured in any one of a plurality of positions, whereby all sides of the foodstuff impaled thereon may be made available to the carver without his having to handle the foodstuff to turn it over or place it on a carving platter or rack.

In a presently preferred embodiment of the invention, the rotisserie rack comprises a quadrilateral frame having side rails for slidable support on the oven side walls, and front and rear rails which provide for rotatably mounting the spit. The spit has a pointed polygonal end for reception in a drive socket or other driving means arranged to be rotated at a predetermined rate by the rotisserie drive motor. A plurality of legs affixed to the frame provide for the support of the frame after the removal thereof from the oven. As presently illustrated, the legs additionally provide means for the support of a pan within which drippings from the cooking foodstuff will collect during the cooking operation. The pan remains in position during the handling of the rack, and advantageously remains in place when the rack is placed on a table or counter during the operation of carving and serving.

To provide for securing the spit in various rotated positions to facilitate carving, I provide latching means on the rack. The latching means is arranged to be brought into operative engagement with a polygonal portion of the spit, and thereby hold the spit against rotation on its axis. At the discretion of the carver, the latch may be released, the spit rotated to expose a new area for carving, and the latch re-engaged to secure the spit in the new position. Because of this feature, it is not only unnecessary but may actually be disadvantageous to remove the foodstuff from the spit prior to carving.

Other features and advantages of the invention will be understood by the accompanying description of a presently preferred embodiment thereof, read in connection with the accompanying drawings, in which:

Fig. 1 is a fragmentary side sectional elevation of a range with the oven in section to show the rotisserie rack in operative position in the oven;

Fig. 2 is a fragmentary perspective of the rack showing the foodstuff impaled on the spit and the latch in inoperative position;

Fig. 3 is a top plan view of the rack with the drip tray removed;

Fig. 4 is an end elevation looking in the direction of the arrows 4—4 of Fig. 3; and Fig. 5 is a side elevational and partially sectional view of the latching mechanism in operative position.

Fig. 1 shows, in partial sectional elevation, a cooking range of the electric type. It is to be understood, of course, that my invention is not limited to electric ranges, nor to ranges of the domestic type; the invention is useful in any type of cooking apparatus having heating means which may be used in broiling, whether or not such heating means are disposed above, or to the side of, foodstuff being cooked.

As shown, however, the range 1 comprises a conventional body structure providing a cooking top 2 having the usual cooking units 3 and backsplash 4 on which are mounted the usual plurality of control switches of which only two, designated 5 and 6 respectively, are shown. Within the body, structural elements provide an open front oven cavity 7 to which the bottom hinged door 8 affords access. Heating elements within the oven cavity include an upper or broiling element 9, suitably supported by frame structure 10 adjacent the top wall of the oven, and having the usual plurality of lead wires 11 served by one of the switches 5 or 6, and controlled thereby with respect to suitable electric power lines (not shown), such as a conventional 236 volt, single phase, Edison A. C. power source. The oven heating means also includes a lower or baking heating element 12, suitably supported in a framework at the bottom of the oven, and connected by means of suitable leads (not shown) to another of the switches on the backsplash, as is well known in the art. In broiling, the lower heating element is not ordinarily used. The oven may be vented through an opening 14 in a wall thereof; said vent communicates with a stack 15 which terminates in an opening below one of the surface heating units 3. A typical venting arrangement is as shown in Berg Patent 2,525,-062, patented October 10, 1950. The respective side walls 16 of the oven are embossed to provide a plurality of protuberances 17, disposed opposite each other in the oven side walls and arranged in alignment from the front to the rear of the oven to provide for the slidable support of oven racks or similar cooking utensils (not shown), and in the present instance for the slidable support of the rotisserie rack 20 comprising the present invention. The arrangement of oven wall embosses is now conventional in the art, and is more particularly described in Rees Patent 2,168,172, granted August 1, 1939, for "Cabinet Rack," and, like the above noted Berg patent, assigned by mesne assignments to my present assignee.

The oven further includes a motor 18 fixed to the rear surface of the rear wall of the oven, and having a drive socket 18.1 projecting through the oven wall into the oven cavity. The motor is arranged to be electrically connected by means of a switch 19 to a 110 volt, A. C. power source (not shown). When energized, the motor rotates its socket 18.1 at a relatively slow speed; for example, 3 R. P. M.

Referring now to Figs. 2 and 3, the rotisserie rack 20 embodying the present invention comprises a main quadrilateral frame formed of relatively heavy wire or rod and thereby having the parallel side rails 21 and 22 and the respective front and rear cross rails 23 and 24. The side rails have pilot end portions 21.1 and 22.1 to assist in guiding the side rails into slidable engagement with certain of the oven side wall embosses 17 which support the rack 20 when it is in its operative position. The leg members 25 extend inwardly and downwardly from the respective side rails and are disposed to avoid conflict with the oven wall embosses 17 when the rack is being inserted and removed from the oven. The feet portions 26 terminate in the upstanding supports 27, to the ends of which is secured a three-sided frame 28, shown best in Fig. 3. Said frame 28 provides a support for the conventional deeply dished pan 30 having a well portion 31 within which meat juices collect during the cooking operation. The well portion has the usual removable plate 32. The open end of the frame facilitates the placement and removal of the tray 30. It will be noted from Fig. 2, that the tray has rolled side edges 33 which fit about the frame 28 and prevent the accidental displacement of the tray while permitting the ready removal thereof.

The transverse rails 23 and 24 of the rack are provided with the respective bearing structures 34 and 35, which rotatably receive a spit 36. As best shown in Fig. 3, said spit comprises a relatively heavy rod, which is circular in cross section at least at the portions received by the respective bearings 34 and 35. The outermost end of the spit is formed to provide a handle 36.1, and the innermost end of the spit has a sharply pointed polygonal end portion 37, which, as shown in Fig. 1, enters the drive socket 18.1, the walls of which engage the walls of the end 37 in driving relation therewith. The spit 36 is equipped with a thrust washer 38, and with the removable forks 40, the tines of each of which extend from a collar 41 having a thumb screw 42 for locking said collar to the main shaft portion of the spit.

In use, the left-hand form 40 (as viewed in Fig. 3) is removed, whereupon the spit is driven through the foodstuff, as shown. It may be necessary to loosen the thumb screw of the remaining fork 40 and move it along the spit to cause its tines to penetrate the foodstuff, whereupon the thumb screw is retightened. The other fork 40 is returned to the spit, driven into the opposite end of the foodstuff and locked home on the spit. The spit is then placed on the bearings and the rack inserted in the oven on those embosses 17 which bring the end 37 into registry with the socket 18.1, whereupon the rack is slid into the oven until the end of the spit is fully engaged within the socket. Obviously, the thrust collar 38 holds the spit against axial displacement during this operation. The pan 30 may or may not be in position at this time; if it is not, it is placed on the frame 28 after the rack has been positioned in the oven.

The heating unit 9 is then energized by operating the appropriate backsplasher switch and the switch 19 operated to energize the drive motor. The foodstuff will be slowly rotated relative to the radiant heating element 9 for the required cooking period. Juices dripping from the foodstuff will be intercepted by the pan 30 and will gather in the well 31.

After cooking, the respective switches are operated to de-energize the heating element and the motor. The handle 36.1 is convenient for withdrawing the rack partly from the oven, whereupon the cook can then grasp the side rails 21 and 22 to complete the removal. The pan remains in position on the lower rack 28. The rack may then be placed on a table or counter top at which the carving and serving is to be done. It will be noted from Fig. 4, that the pan 30 is clear of the counter top.

A feature of my invention is the facility with which the spit and rack 20 may be used as a carving frame. To this end, I mount on the rear rail 24 a latching member 43, which, as best shown in Fig. 5, has a central portion 44 by means of which the latch may be pivoted to an angle member 45 fixed to the rear rail 24. An end 46 of the latch offers a thumb engagement portion for easy rotation of the latch on its pivot. The opposite end 47 of the latch is bifurcated and, as shown in Fig. 4, will rotate into engagement with the polygonal end 37 of the spit. Obviously, when the rack 20 is within the oven and the spit is being rotated by the motor 18, the latch 43 will be withdrawn from the spit, as shown in Fig. 2. However, when the foodstuff is being carved, the latch 43 is rotated into its engaged position, shown in Figs. 3, 4, and 5, and its bifurcated end 47 locks the spit securely against rotation in its bearings. The available areas of the foodstuff may be carved while the locking device and the respective forks 40 secure the foodstuff against rotation on the spit. The latch 43 may then be released and the spit rotated by its handle 36.1 to present a new area for carving, whereupon the latch may be returned to its locking position.

Summarizing, the rotisserie device embodying my invention provides means for supporting a spit and a drip pan in fixed relation to facilitate placement in, and removal from, an oven or the like, and additionally provides for the advantageous handling of the cooked foodstuff for carving and serving.

While there has been described what is at present considered to be the preferred embodiment of the invention, it will be understood that various modifications may be made therein, and it is intended to cover in the appended claim all such modifications as fall within the scope of the invention.

I claim:

A rotisserie rack, comprising structure providing a rigid frame portion for placement within a cooking cavity and removal therefrom following the cooking operation, said frame having transversely extending front and rear members, leg members for supporting said structure on a counter or the like following such removal, open-topped bearing means carried by said members, a spit removably and rotatably carried by said bearing members, said spit having a polygonal rear end portion, latching means pivotally attached to rear member, said latching means having a bifurcated end defined by wall means engageable with said polygonal spit portion to lock said spit against rotation in said bearing means, and means for maintaining said latching means in disengaged relationship to said spit to permit the free rotation thereof in said bearing means.

References Cited in the file of this patent

UNITED STATES PATENTS

| | | |
|---|---|---|
| 1,718,961 | Humphrey | July 2, 1929 |
| 1,888,616 | Bocchino | Nov. 22, 1932 |
| 2,330,132 | Martin et al. | Sept. 21, 1943 |
| 2,349,617 | Gorman | May 5, 1944 |
| 2,504,237 | Weissbach | Apr. 18, 1950 |